(12) United States Patent
Su

(10) Patent No.: US 11,318,525 B1
(45) Date of Patent: May 3, 2022

(54) METHOD FOR MANUFACTURING A GOLF CLUB HEAD MADE OF SOFT IRON

(71) Applicant: Chi Hung Su, Tainan (TW)

(72) Inventor: Chi Hung Su, Tainan (TW)

( * ) Notice: Subject to any disclaimer, the term of this patent is extended or adjusted under 35 U.S.C. 154(b) by 0 days.

(21) Appl. No.: 17/144,553

(22) Filed: Jan. 8, 2021

(51) Int. Cl.
  *B23P 11/00* (2006.01)
  *A63B 53/04* (2015.01)
  *B21K 17/00* (2006.01)

(52) U.S. Cl.
  CPC .......... *B21K 17/00* (2013.01); *A63B 53/0408* (2020.08); *A63B 53/0475* (2013.01)

(58) Field of Classification Search
  CPC ... A63B 53/04; A63B 53/042; A63B 53/0425; A63B 53/0466; A63B 53/047; A63B 43/0475; A63B 5053/0479; A63B 2053/0483; A63B 53/0487; A63B 53/0408; A63B 53/0475; B21K 17/00
  USPC .................................................. 473/324–350
  See application file for complete search history.

(56) References Cited

U.S. PATENT DOCUMENTS

| | | | |
|---|---|---|---|
| 8,454,453 B2 * | 6/2013 | Hettinger | A63B 53/04 473/350 |
| 8,926,451 B2 * | 1/2015 | Deshmukh | A63B 53/047 473/349 |
| 9,327,172 B2 * | 5/2016 | Deshmukh | A63B 53/0466 |
| 9,387,370 B2 * | 7/2016 | Hebreo | A63B 53/04 |
| 9,616,303 B2 * | 4/2017 | Wu | A63B 53/047 |
| 9,616,304 B2 * | 4/2017 | Deshmukh | B21K 17/00 |
| 9,884,231 B2 * | 2/2018 | Hebreo | B23K 20/227 |
| 9,937,394 B2 * | 4/2018 | Harrington | A63B 53/047 |
| 10,071,292 B2 * | 9/2018 | Wu | A63B 53/06 |
| 10,207,162 B2 * | 2/2019 | Deshmukh | A63B 53/0466 |
| 10,220,275 B2 * | 3/2019 | Hebreo | A63B 53/04 |
| 10,391,370 B2 * | 8/2019 | Tassistro | A63B 53/0475 |
| 10,398,951 B2 * | 9/2019 | Golden | A63B 53/0475 |
| 10,888,917 B2 * | 1/2021 | Hebreo | A63B 53/0416 |
| 11,065,513 B2 * | 7/2021 | Tassistro | A63B 53/047 |

FOREIGN PATENT DOCUMENTS

| | | | | |
|---|---|---|---|---|
| CN | 2277802 | | 4/1998 | |
| JP | 04156868 A | * | 5/1992 | ........ A63B 53/0425 |
| JP | 09206410 A | * | 8/1997 | |
| JP | 2005052314 A | * | 3/2005 | |
| JP | 2005131280 A | * | 5/2005 | ........... A63B 53/047 |
| TW | 201819093 A | | 6/2018 | |

* cited by examiner

*Primary Examiner* — Alvin A Hunter
(74) *Attorney, Agent, or Firm* — Rabin & Berdo, P.C.

(57) ABSTRACT

A method has acts of providing a blank of head, providing a reinforcement element, combining the blank of head and the reinforcement element, and co-forging. The blank of head is made of a material having a hardness ranging from HRB50 to HRB105 measured by Rockwell Hardness Test and being softer than HRB105 and has a recess. The reinforcement element is made of a material having a hardness ranging from HRC15 to HRC55 measured by Rockwell Hardness Test. The reinforcement element is put into the recess in the blank of head, and an inner surface of the recess and the reinforcement element are combined securely with each other completely by a welding process. The blank of head combined with the reinforcement element is put into a mold, is heated to 700° C. to 1100° C., and is applied with a co-forging process to form an eutectic bonding by thermocompression.

18 Claims, 9 Drawing Sheets

METHOD FOR MANUFACTURING A GOLF CLUB HEAD MADE OF SOFT IRON

BACKGROUND OF THE INVENTION

1. Field of the Invention

The present invention relates to a method, and more particularly to a method for manufacturing an iron or wedge club head made of soft iron by a forging process.

2. Description of Related Art

For having a soft hitting feel, excellent controllability, and a better hitting sound while a golf club, such as an iron or a wedge, hits a golf ball, a club head of the golf club is usually made of a soft iron material. The soft iron material may be selected from low-carbon steel, such as SAE1020C, SAE1025C, SAE1030C or SAE1035C. Because the soft iron material for the club head has a low hardness, wherein the hardness of material ranges from HRB 70 to HRB 90, the golf club head is easily damaged when the golf club head is applied to hit a golf ball. Thus, a permanent appearance defect is produced on the golf club head. In addition, the appearance defect is also caused by being worn due to hitting a golf ball. Therefore, the controllability and accuracy of ball hitting of the golf club head is negatively influenced. Alternatively, grooves in a hitting face of the club head are worn off, and the spin of the golf club is negatively influenced. Consequently, a sole bounce of the golf club head is changed, such that an angle, height, or flying instance of hitting a golf ball will also be negatively influenced.

To overcome the shortcomings, the present invention tends to provide a method for manufacturing a golf club head made of soft iron to mitigate or obviate the aforementioned problems.

SUMMARY OF THE INVENTION

The main objective of the invention is to provide a method for manufacturing a golf club head made of soft iron to solve the problems caused by the conventional golf club head.

The method for manufacturing a golf club head made of soft iron has acts of providing a blank of head, providing a reinforcement element, combining the blank of head and the reinforcement element, and co-forging. In the act of providing a blank of head, the blank of head is made of an iron based material having a hardness ranging from HRB50 to HRB105 measured by Rockwell Hardness Test and being softer than HRB105 and has a recess formed in a predetermined position on the blank of head. In the act of providing a reinforcement element, the reinforcement element is made of an iron based material having a hardness ranging from HRC15 to HRC55 measured by Rockwell Hardness Test and has a shape corresponding to a shape of the recess in the blank of head.

In the act of combining the blank of head and the reinforcement element, the reinforcement element is put into the recess in the blank of head, and an inner surface of the recess and the reinforcement element are combined securely with each other completely by a welding process. In the act of co-forging, the blank of head combined with the reinforcement element is put into a mold, is heated to 700° C. to 1100° C., and is applied with a co-forging process to form an eutectic bonding between the blank of head and the reinforcement element by thermocompression to form a club head.

The method for manufacturing a golf club head made of soft iron in accordance with the present invention can achieve the following advantages.

1. Because the reinforcement element is made of a material having a high hardness, the reinforcement element is not easily damaged when the club head hits a golf ball. Thus, a permanent appearance defect is prevented, such that the useful life of the golf club head can be prolonged.

2. With the two components made of different materials being combined with each other under high temperature and high pressure conditions, the blank of head and the reinforcement element can be combined with each other firmly without gaps. Additionally, with the thermocompression effect in the act of co-forging, the two components made of different materials can be completely combined with each other as a single part, such that the club head has a smooth appearance. In addition, the club head made by the method in accordance with the present invention still has characteristics same as those of the conventional one made of a soft material, such as soft hitting feel, excellent controllability, and better hitting sound.

3. In the act of combining the blank of head and the reinforcement element, the reinforcement element is combined with the inner surface of the recess in all areas, so that the two components can be combined with each other firmly without gaps. Therefore, in the act of co-forging, the reinforcement element can be prevented from being deviated relative to the blank of head, and the reinforcement element can be held in a precise position. Consequently, the golf club head made by the method in accordance with the present invention has a smooth appearance without surface defects and welding marks.

4. The reinforcement element may be the hitting face having grooves for hitting a golf ball or a sole that is usually rubbed with the ground, and the structural strength of the hitting face or the sole can be enhanced. The function of grooves and the sole bounce can be maintained in the original conditions for a long term of use, and the accuracy of hitting a ball of the club head can be improved.

After the blank of head is combined with the reinforcement element by the welding process, the welded portion between the inner surface of the recess in the blank of head and the reinforcement element is applied with an act of sandblasting to remove oxides generated during the welding process. The welded portion between the inner surface of the recess in the blank of head and the reinforcement element is then ground to remove solidified redundant material generated by melt overflow during the welding process. Accordingly, the golf club head made by the method in accordance with the present invention has a good quality.

With different design demands, the depth of the recess can be changed and the shape of the reinforcement element is also changed based on the depth of the recess. With the welding process under high temperature and high pressure conditions and the co-forging process, the blank of head and the reinforcement element can be combined with each other in a preferable combination condition. Accordingly, the arrangement between a body made of a soft material and the reinforcement element made of a hard material can achieve a best balance, and the club head made by the method in accordance with the present invention has a soft hitting feel, a good hitting sound, excellent controllability, and a good hitting function.

DETAILED DESCRIPTION OF PREFERRED EMBODIMENT

Figure 1:
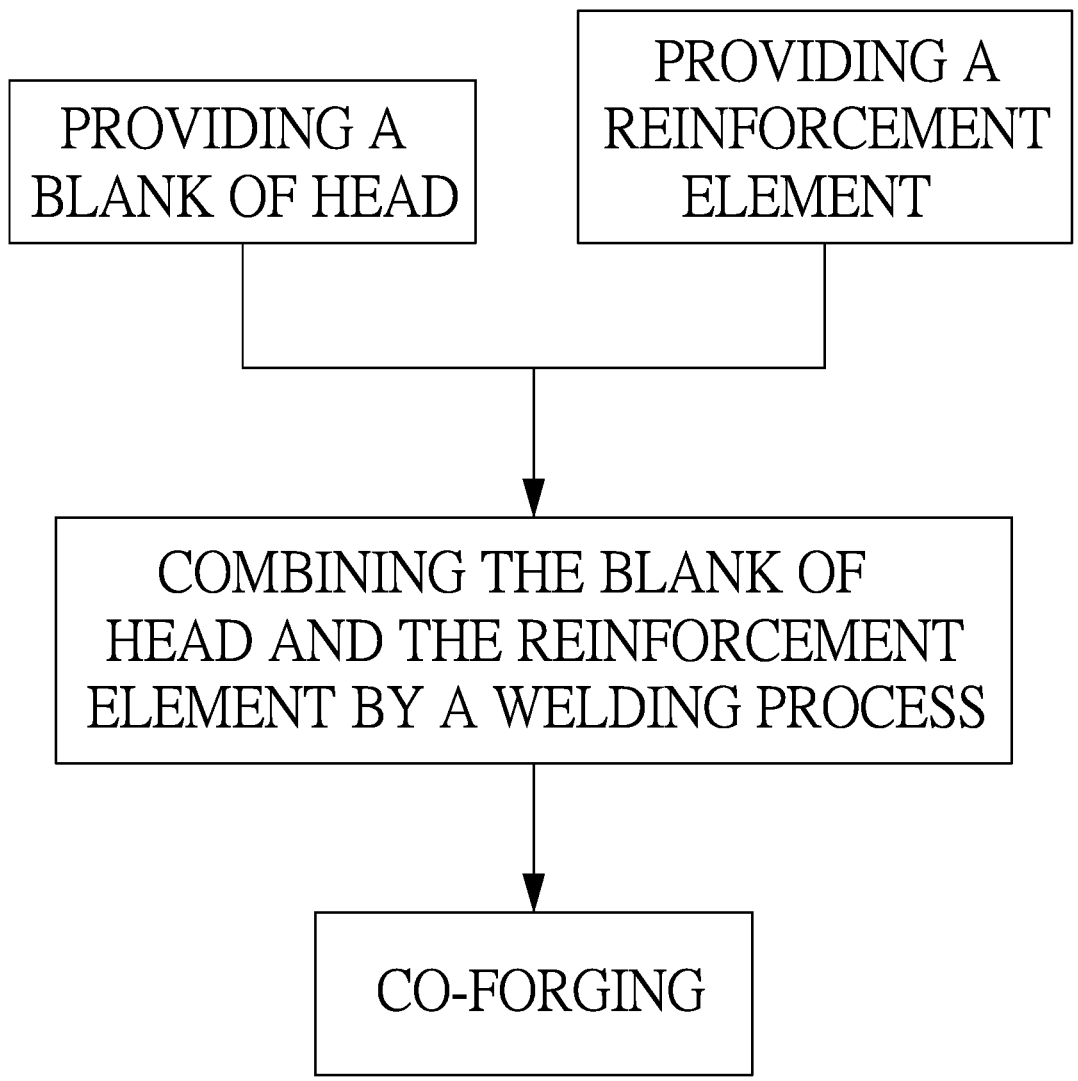
FIG. 1 is a block diagram of a method for manufacturing a golf club head made of soft iron in accordance with the present invention.

The present invention relates to a method for manufacturing a golf club head made of soft iron, such as a club head of an iron or a wedge. With reference to FIG. 1, the method in accordance with the present invention comprises acts of providing a blank of head, providing a reinforcement element, combining the blank of head and the reinforcement element, and co-forging.

Figure 5:
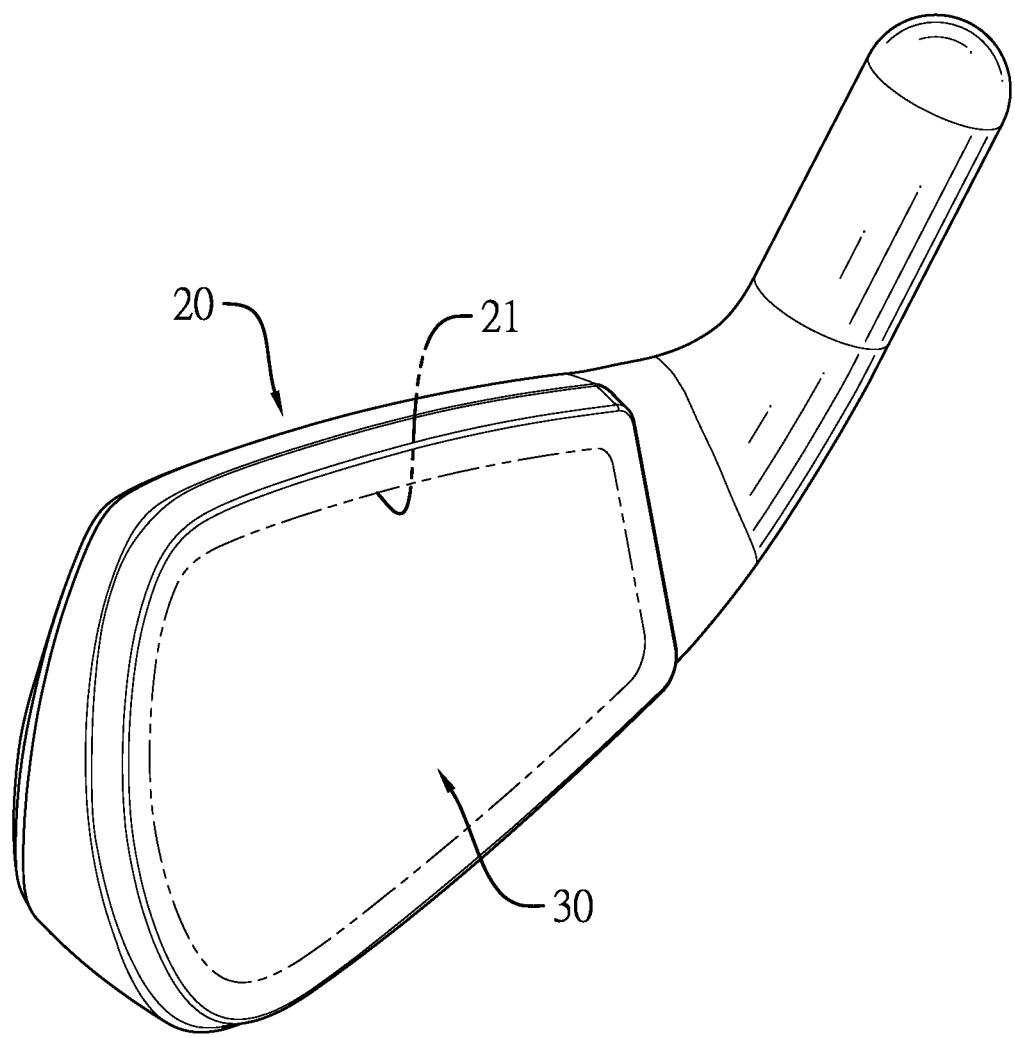
FIG. 5 is a perspective view of the blank of head combined with the reinforcement element in FIG. 4.

In the act of providing a blank of head, an iron based material having a hardness ranging from HRB50 to HRB105 measured by Rockwell Hardness Test and being softer than HRB105 is formed as a blank of head having a predetermined shape. With reference to FIGS. 5 to 9, a recess 21, 21A, 21B is formed in a predetermined position on the blank of head 20. The predetermined position is determined by a position on a club head that needs to be reinforced. The predetermined position may be located on at least one of a blade, a back, a face, and a sole of a club head. The predetermined position also may be on a part or all of one of the blade, the back, the face, and the sole of the club head. With reference to FIG. 5, the predetermined position provided with the recess 21 is on the entire face. With reference to FIG. 7, the predetermined position provided with the recess 21 is on a part of the face. With reference to FIG. 9, the predetermined position provided with the recess 21 21A, 21B is on the face, the back, and the sole.

The material for the blank of head 20 is selected from low-carbon steel or carbon steel having a carbon content lower than 0.5%, such as a low-carbon steel SAE 1020C, SAE 1025C, SAE 1030C, SAE 1035C, carbon steel SAE 1040C, or Nickel-chromium-molybdenum alloy steel SAE 8620, or low carbon alloy steel containing trace metal, such as Nickel, Chromium, or Manganese.

Figure 2:
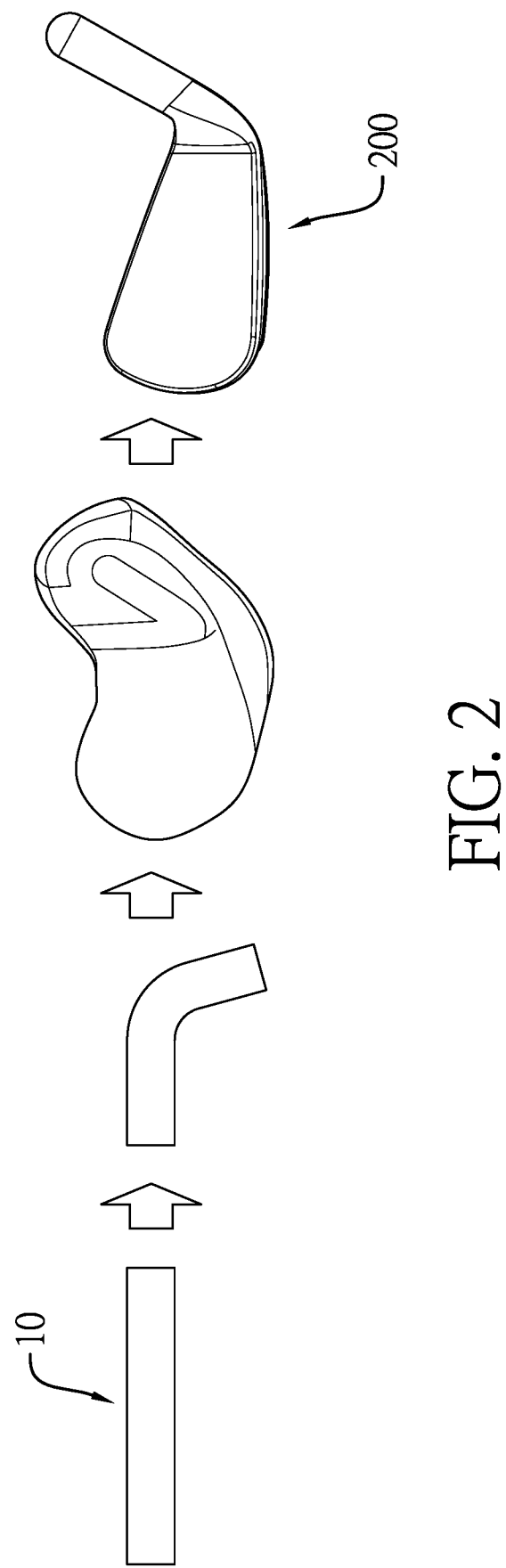
FIG. 2 shows a perspective view of the act of providing a blank of head of the method in FIG. 1.
Figure 3:
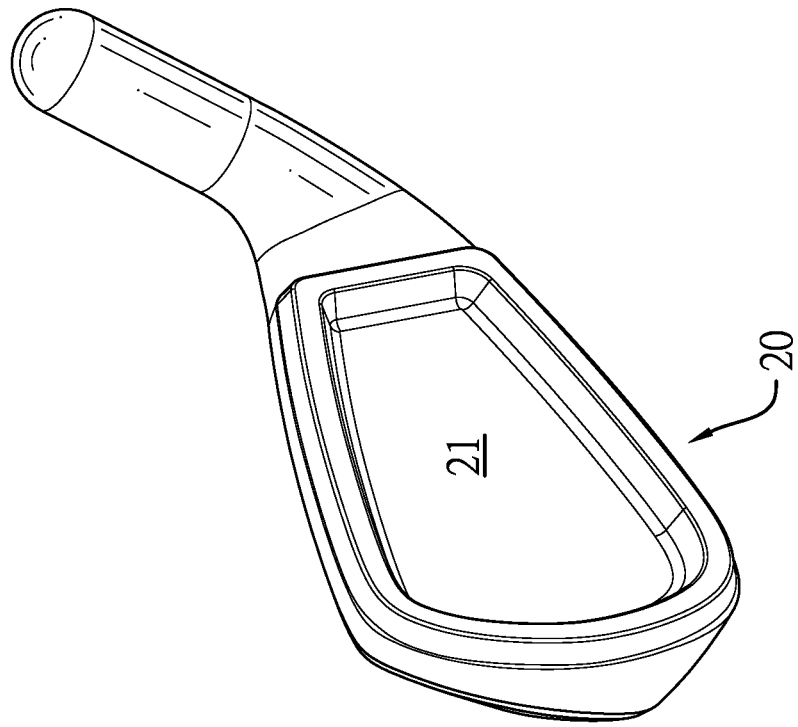
FIG. 3 shows a perspective view of the blank of head in FIG. 2.
Figure 3:
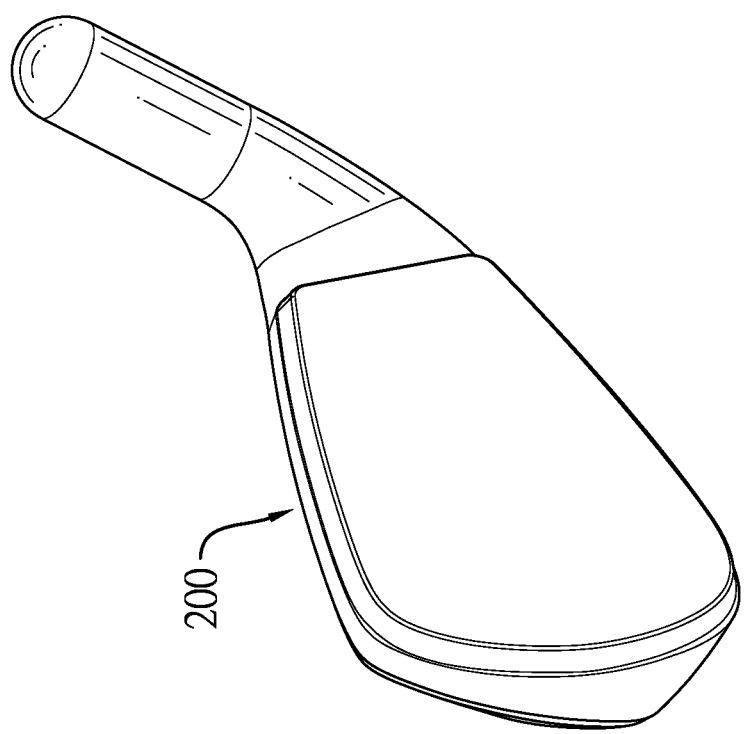
Figure 4:
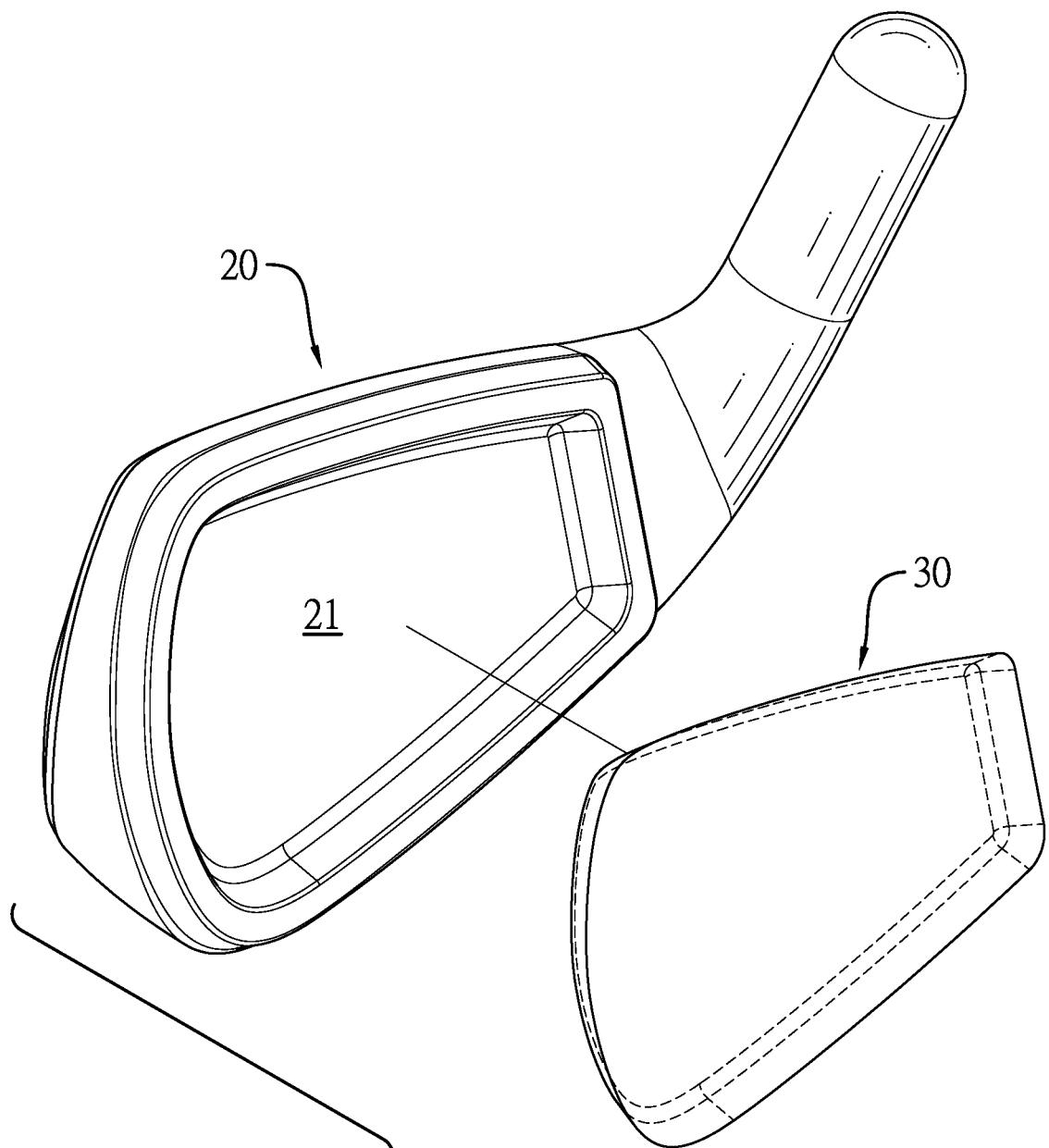
FIG. 4 is an exploded perspective view of a reinforcement element and the blank of head in FIG. 3.

With reference to FIG. 2, in the act of providing a blank of head, a rod 10 made of a low hardness iron material (soft iron) is bent and shaped into a blank 200 having a predetermined shape by forging. With reference to FIG. 3, the blank 200 is provided with a recess 21 by a machine tool or during the aforementioned forging process.

Figure 6:
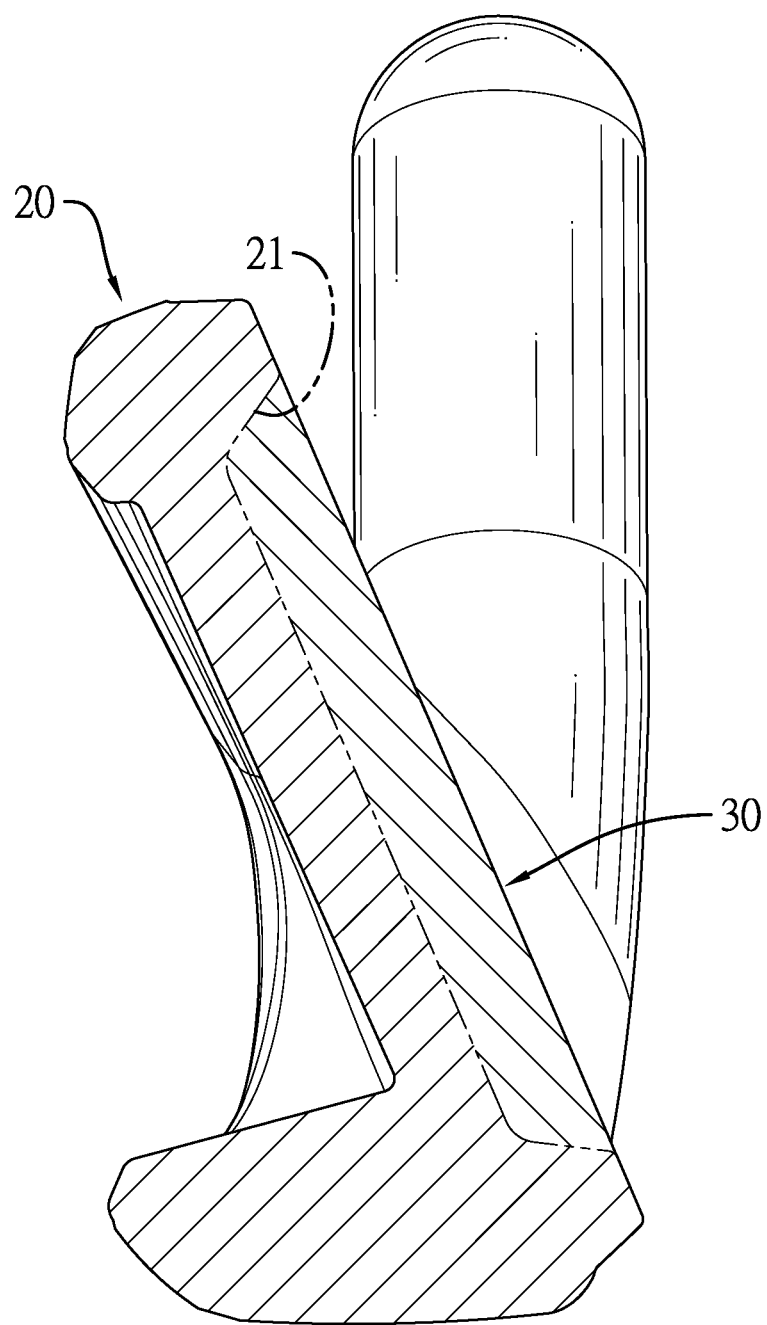
FIG. 6 is a cross sectional side view of the blank of head combined with the reinforcement element in FIG. 5.
Figure 7:
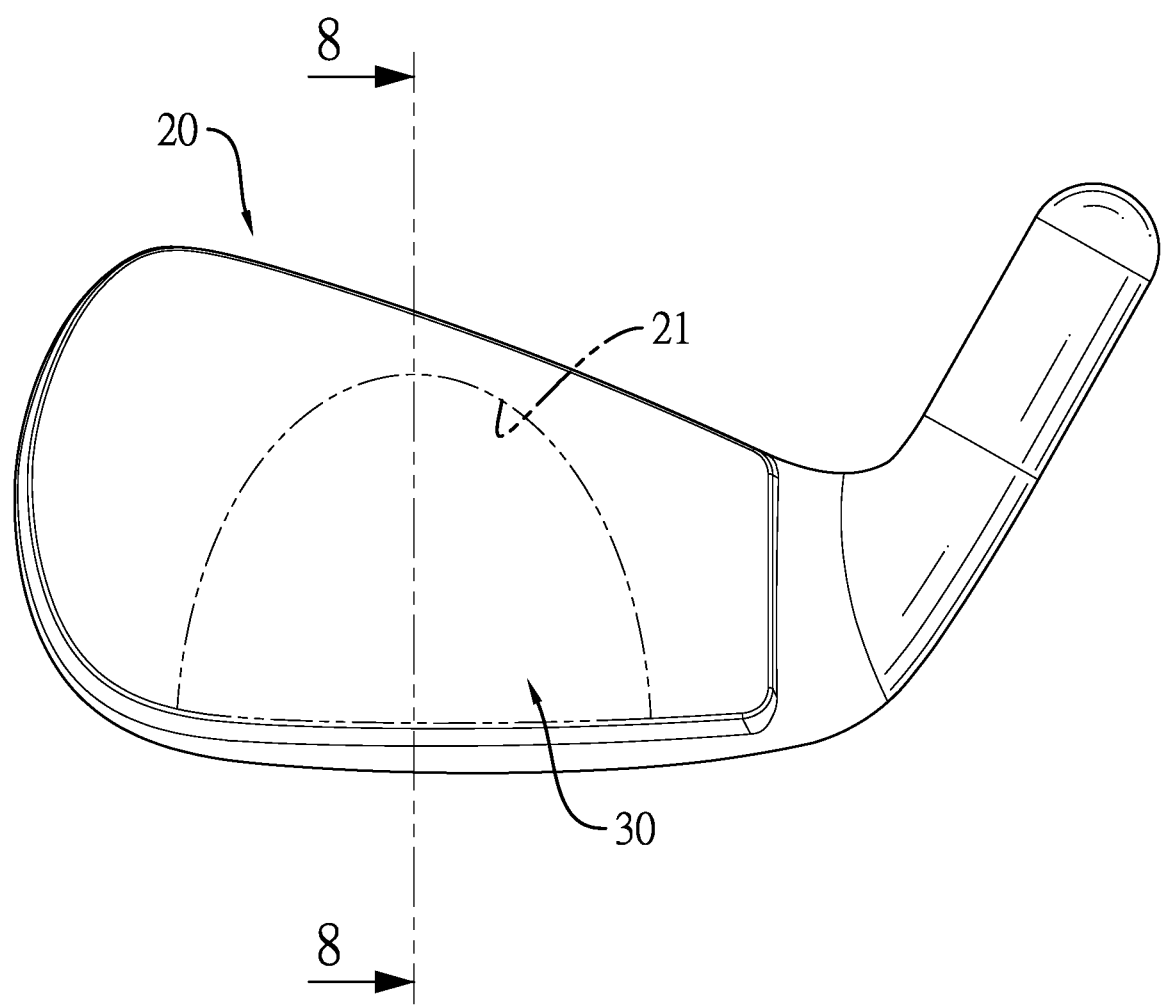
FIG. 7 is a front side view of another embodiment of a blank of head combined with a reinforcement element in accordance with the present invention.
Figure 8:
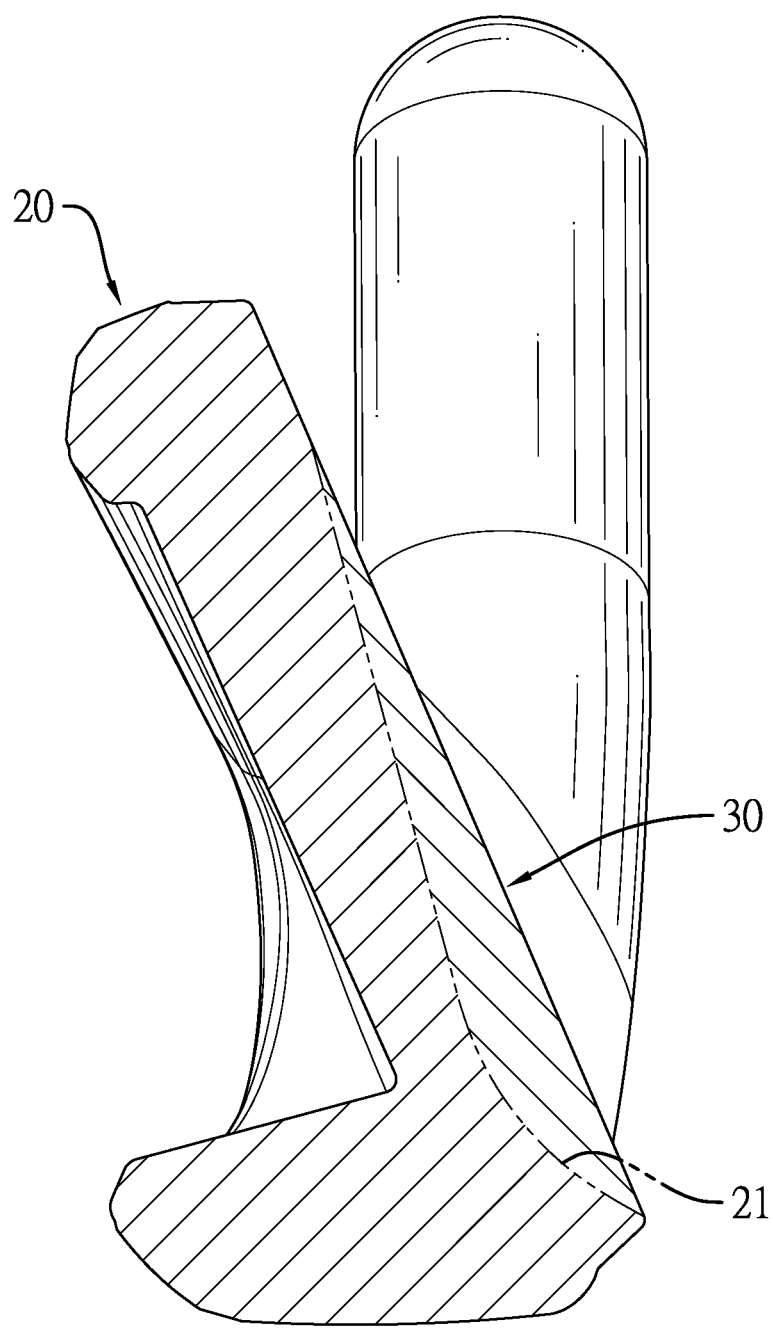
FIG. 8 is a cross sectional side view of the blank of head combined with the reinforcement element in FIG. 7.
Figure 9:
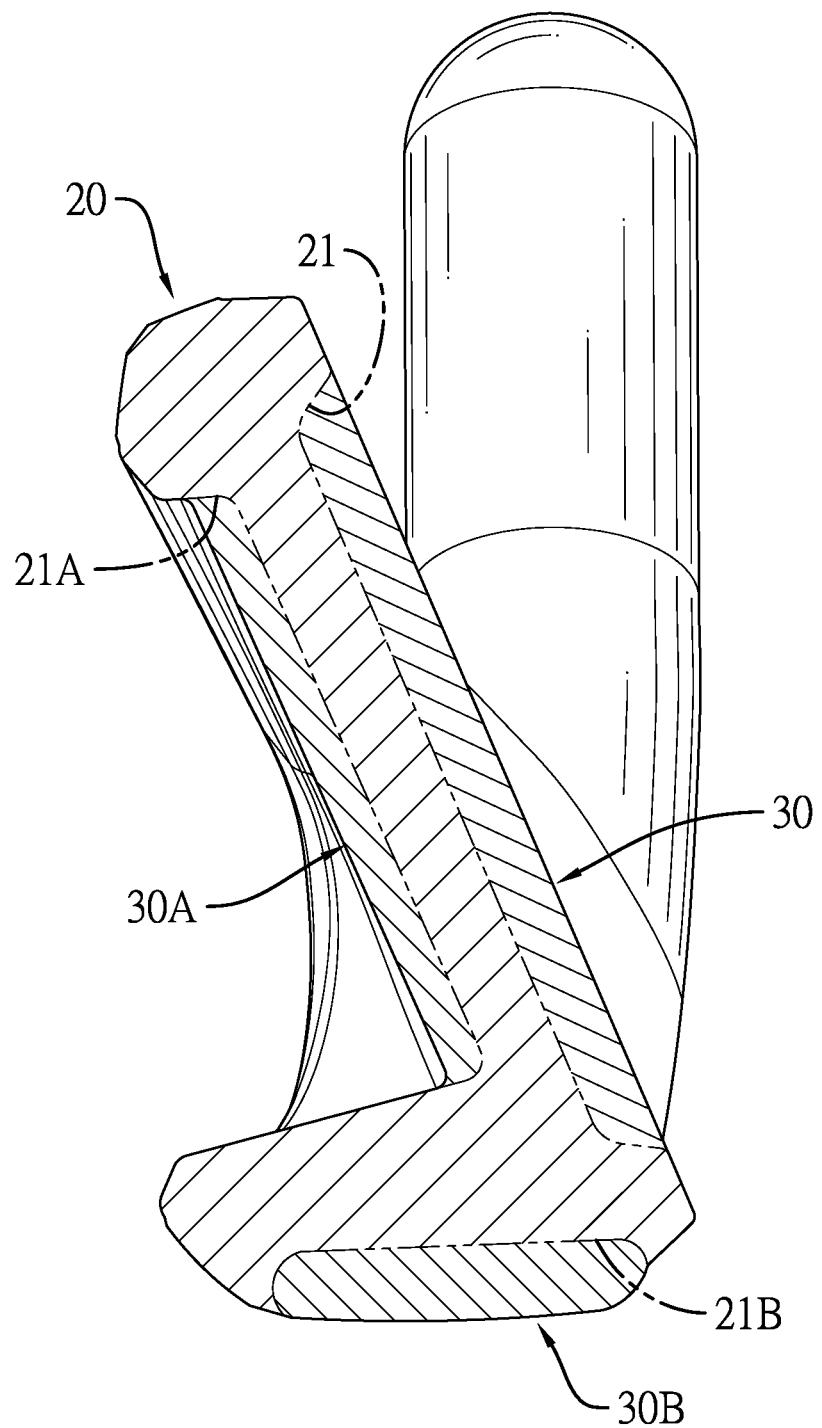
FIG. 9 is a cross sectional side view of a further embodiment of a blank of head combined with the reinforcement element in accordance with the present invention.

With reference to FIGS. 6, 8, and 9, in the act of providing a blank of head, the recess 21 has a depth ranging from 0.2 millimeters (mm) to 5.0 mm. The recesses 21, 21A, 21B in different positions may have different depths from each other based on different design demands. With reference to FIGS. 6 and 9, each recess 21, 21A, 21B may have a single depth or may be divided into multiple portions having different depths. With reference to FIG. 9, the recess 21 is divided into a peripheral portion and a central portion having a depth deeper than a depth of the peripheral portion.

In the act of providing a reinforcement element, an iron based material having a hardness ranging from HRC15 to HRC555 measured by Rockwell Hardness Test is formed as a reinforcement element. With reference to FIGS. 4 to 9, the reinforcement element 30, 30A, 30B has a shape corresponding to a shape of the recess 21, 21A, 21B in the blank of head 20. The material for the reinforcement element 30, 30A, 30B is harder than that for the blank of head 20.

In the act of providing a reinforcement element, the iron based material for the reinforcement element may be selected from carbon steel or high-carbon steel having a hardness ranging from FRC 20 to HRC 50, such as carbon steel SAE 1045C, SAE 1050C, SAE 1055C, or SAE 1060C. The material may be selected from an alloy material having a hardness ranging from HRC 20C to HRC55 measured by Rockwell Hardness Test and a carbon content ranging from 0.3% to 0.6% and containing another metal, for example, Chrome Molybdenum Alloy Steel SAE 4130, SAE 4140, or SAE 4340. The material may be also selected from a stainless steel material having a hardness ranging from HRC 20 to HRC55 measured by Rockwell Hardness Test, such as Maraging steel SUS 630.

In the act of combining the blank of head and the reinforcement element, with reference to FIGS. 4 to 9, the reinforcement element 30 is put into the recess 21 in the blank of head 20. The inner surface of the recess 21 and the reinforcement element 30 are combined securely with each other completely by a welding process. In the welding process, the inner surface of the recess 21 and the reinforcement element 30 are combined securely with each other completely, which means that the entire area of a back face and a side face of the reinforcement element 30 is combined with the inner surface of the recess 21 by the welding process, such that no gap is formed between the reinforcement element 30 and the recess 21 to ensure the reinforcement element 30 can be combined with the blank of head 20 firmly. Preferably, in the welding process, the welding process is performed at the temperature of 1700° C. to 2500° C. The welding process may be argon arc welding, plasma welding, or laser welding.

In the act of combining the blank of head and the reinforcement element, after the inner surface of the recess 21 is combined with the reinforcement element 30 by the welding process, the welded portion between the inner surface of the recess 21 in the blank of head 20 and the reinforcement 30 is applied with an act of sandblasting to remove oxides generated during the welding process. The welded portion between the inner surface of the recess 21 in the blank of head 20 and the reinforcement element 30 may then be ground to remove solidified redundant material generated by melt overflow during the welding process.

In the act of co-forging, the blank of head 20 combined with the reinforcement element 30 is put into a mold, is heated to 700° C. to 1100° C., and is applied with a co-forging process to form an eutectic bonding between the blank of head 20 and the reinforcement element 30 by thermocompression to form a club head. After the act of co-forging, the two components made of different materials can be securely combined with each other firmly. Accordingly, the club head has a smooth appearance without surface defects and welding marks.

In the act of co-forging, the number of forging is determined dependent on the demand of the shape of the club head or material characteristics of the blank of head 20 combined with the reinforcement element 30. When the number of forging is increasing, the eutectic bonding between the blank of head 20 and the reinforcement element 30 is more enhanced and the microstructure between the blank of head 20 and the reinforcement element 30 is finer.

After the act of co-forging, the face of the club head may be provided with grooves or be applied with another machining process dependent on the demands. The club head may then be applied with grinding, cleaning, paint-spraying, or plating processes. The grinding, cleaning, paint-spraying, and plating processes may be conventional, and the detailed descriptions thereof are omitted.

With the method for manufacturing a golf club head made of soft iron in accordance with the present invention, the reinforcement element 30 is made of a material having a higher hardness, and the combination between the reinforcement element 30 and the blank of head 20 is firm without gaps. With the act of co-forging, the two components made of different materials can be combined together firmly, and the club head has a smooth appearance. Therefore, the body of the club head is made of a material having a soft hardness and a reinforcement portion of a high hardness, so the club head still has a soft hitting feel, excellent controllability, and a better hitting sound.

In addition, the club head made by the method in accordance with the present invention has a reinforcement portion made of a material of high hardness, so the club head is not easily damaged, such that permanent appearance defect can be prevented on the club head and the useful life of the club head can be prolonged. Furthermore, because the club head is not easily damaged, the shape of the club head can be kept for a long term of use. Thus, the grooves in the hitting face or the bounce of the sole of the club head can be maintained in the original condition, so that the function and accuracy of hitting a ball of the club head will not be negatively influenced.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A method for manufacturing a golf club head made of soft iron comprising acts of:
   providing a blank of head, wherein the blank of head is made of an iron based material having a hardness ranging from HRB50 to HRB105 measured by Rockwell Hardness Test and has a recess formed in a predetermined position on the blank of head;
   providing a reinforcement element, wherein the reinforcement element is made of an iron based material having a hardness ranging from HRC15 to HRC55 measured by Rockwell Hardness Test and has a shape corresponding to a shape of the recess in the blank of head;
   combining the blank of head and the reinforcement element, wherein the reinforcement element is put into the recess in the blank of head, and an inner surface of the recess and the reinforcement element are combined securely with each other completely by a welding process; and
   co-forging, wherein the blank of head combined with the reinforcement element is put into a mold, is heated to 700° C. to 1100° C., and is applied with a co-forging process to form an eutectic bonding ranging from the blank of head and the reinforcement element by thermocompression to form a golf club head.

2. The method as claimed in claim 1, wherein in the act of combining the blank of head and the reinforcement element, the welding process is performed at a temperature of 1700° C. to 2500° C.

3. The method as claimed in claim 2, wherein
   in the act of combining the blank of head and the reinforcement element, the welded portion between the inner surface of the recess in the blank of head and the reinforcement is applied with an act of sandblasting to remove oxides generated during the welding process after the welding process; and
   the welded portion between the inner surface of the recess in the blank of head and the reinforcement element is then ground to remove solidified redundant material generated by melt overflow during the welding process.

4. The method as claimed in claim 3, wherein the material for the blank of head is selected from low-carbon steel or carbon steel having a carbon content lower than 0.5%.

5. The method as claimed in claim 3, wherein
   the predetermined position on the blank of head is at least a part of one of a blade, a back, a face, and a sole of a club head; and
   the recess has a depth ranging from 0.2 millimeters to 5.0 millimeters.

6. The method as claimed in claim 5, wherein the recess has a single depth.

7. The method as claimed in claim 5, wherein the recess is divided into multiple portions having different depths.

8. The method as claimed in claim 7, wherein the recess is divided into a peripheral portion and a central portion having a depth deeper than a depth of the peripheral portion.

9. The method as claimed in claim 2, wherein the material for the blank of head is selected from low-carbon steel or carbon steel having a carbon content lower than 0.5%.

10. The method as claimed in claim 2, wherein
    the predetermined position on the blank of head is at least a part of one of a blade, a back, a face, and a sole of a club head; and
    the recess has a depth ranging from 0.2 millimeters to 5.0 millimeters.

11. The method as claimed in claim 10, wherein the recess has a single depth.

12. The method as claimed in claim 10, wherein the recess is divided into multiple portions having different depths.

13. The method as claimed in claim 12, wherein the recess is divided into a peripheral portion and a central portion having a depth deeper than a depth of the peripheral portion.

14. The method as claimed in claim 1, wherein the material for the blank of head is selected from low-carbon steel or carbon steel having a carbon content lower than 0.5%.

15. The method as claimed in claim 1, wherein the predetermined position on the blank of head is at least a part of one of a blade, a back, a face, and a sole of a club head; and the recess has a depth ranging from 0.2 millimeters to 5.0 millimeters.

16. The method as claimed in claim 15, wherein the recess has a single depth.

17. The method as claimed in claim 15, wherein the recess is divided into multiple portions having different depths.

18. The method as claimed in claim 17, wherein the recess is divided into a peripheral portion and a central portion having a depth deeper than a depth of the peripheral portion.

* * * * *